US007558797B2

(12) United States Patent
Li (10) Patent No.: US 7,558,797 B2
(45) Date of Patent: Jul. 7, 2009

(54) METADATA STRUCTURES FOR MASS P2P FILE SHARING

(75) Inventor: Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 11/427,994

(22) Filed: Jun. 30, 2006

(65) Prior Publication Data

US 2008/0005120 A1    Jan. 3, 2008

(51) Int. Cl.
*G06F 17/30*    (2006.01)
(52) U.S. Cl. .................... 707/10; 707/1; 707/104.1
(58) Field of Classification Search ............... 707/1, 707/3, 5, 100, 104.1; 709/217, 204
See application file for complete search history.

(56) References Cited

U.S. PATENT DOCUMENTS

| 7,263,560 | B2 * | 8/2007 | Abdelaziz et al. | 709/238 |
|---|---|---|---|---|
| 7,328,366 | B2 * | 2/2008 | Michelman | 714/6 |
| 7,433,928 | B1 * | 10/2008 | Ranade et al. | 709/216 |
| 2002/0046232 | A1 * | 4/2002 | Adams et al. | 709/200 |
| 2004/0215600 | A1 * | 10/2004 | Aridor et al. | 707/3 |
| 2005/0131871 | A1 * | 6/2005 | Howard et al. | 707/3 |
| 2006/0031386 | A1 * | 2/2006 | Burbeck | 709/217 |

OTHER PUBLICATIONS

S. Saroiu, K. P. Gummadi and S. D. Gribble, "Measuring and analyzing the characteristics of Napster and Gnutella hosts", in Proc. 2003 Multimedia Systems, vol. 9, No. 2, Aug. 2003, pp. 170-184.

H. Choon, N. Sarana and B. Rajkumar, "P2P networks for content sharing", Technical report, GRIDS-TR-2003-7, Univ. of Melbourne, Australia, Dec. 2003.
A. Sharma, "The FastTrack Network", PC Quest magazine, Sep. 12, 2002.
T. Hobfeld, K. Leibnitz, R. Pries, K. Tutschku, P. Tran-Gai, and K. Pawlikowski, "Information diffusion in eDonkey filesharing networks", Univ. of Wurzburg, Rep. No. 341, Sep. 2004.
B. Cohen, "Incentives build robustness in BitTorrent", in Proc. Workshop on Economics of peer-to-peer systems, 2003.
M. Ital, et. al., "Dissecting BitTorrent: five months in a torrent's lifetime", in Proc. 5th International Workshop on Passive and Active Network Measurement, PAM 2004, Antibes Juan-les-Pins, France, Apr. 19-20, 2004.

* cited by examiner

*Primary Examiner*—Tim T. Vo
*Assistant Examiner*—Dangelino N Gortayo
(74) *Attorney, Agent, or Firm*—Lyon & Harr, LLP; Mark A. Watson (57) ABSTRACT

A "Mass File Sharer" (MFS) provides a mass P2P file sharing protocol with optional on-demand file access across a P2P network. Unlike conventional P2P file sharing, the MFS simultaneously asynchronously shares large numbers of files, while providing optional on-demand (synchronous) access to shared files. The MFS uses a unique metadata structure in combination with an inter-peer file/folder version analysis and an inter-peer file/folder availability analysis to share complex directory structures that may include any number of folders, sub-folders, and files. Sharing may be asynchronous and/or synchronous. Specifically, file sharing is generally accomplished as an asynchronous distribution across the network. However, when a particular peer wants direct access particular files, an on-demand access mode is used to enable synchronous delivery of shared files. This combination of asynchronous and synchronous file distribution enables the MFS to support a number of applications, such as on-demand movie viewing, file/folder browsing, etc.

16 Claims, 5 Drawing Sheets

METADATA STRUCTURES FOR MASS P2P FILE SHARING

BACKGROUND

1. Technical Field

The invention is related to peer-to-peer (P2P) file sharing, and in particular, to a system and method for P2P file sharing that allows for simultaneous sharing and access of multiple folders, sub-folders, and/or files with optional on-demand file access.

2. Related Art

In general, a peer-to-peer (P2P) network is a network that relies on the computing power and bandwidth of participant peers rather than a few large servers. The basic idea of peer-to-peer (P2P) networks is to allow each peer in the network to directly share individual files, and/or to assist a server in distributing either individual files or streaming media content. As is well known to those skilled in the art, there are a large number of conventional approaches to implementing P2P networks.

For example, one conventional P2P-based file-sharing scheme uses one or more servers to maintain a centralized file list. For peers that wish to receive a particular file, the server will instruct those peers to establish direct connections with other peers known by the server to contain all or part of the file that is to be shared. As a result, the overhead that would otherwise result from the central server being required to serve the requested file to one or more of the peers is eliminated.

Other conventional P2P file sharing applications operate using the concept of a decentralized network. Unfortunately, many such schemes are unable to scale to very large numbers of peers without being overwhelmed by data requests such as the broadcast search message traffic that must be exchanged between the peers. Related conventional schemes partially address such concerns by using the concept of "supernodes" to provide for semi-centralized search and indexing. For example, when a peer first connects to the network, it attempts to contact one or more IP addresses corresponding to a list of known supernodes. As soon as it finds a working supernode, the peer requests a list of currently active supernodes to be used for further connection attempts. The peer then picks one supernode as its server and uploads a list of files it intends to share to that supernode. It also sends search requests to the supernode for files it wants to receive. The supernode then communicates with other supernodes in order to satisfy the peer search requests, and provides the results of those communications back to the peer. The peer then contacts other "matching" peers directly in order to perform the actual P2P file sharing.

Yet another related conventional P2P scheme uses servers that act as communication hubs for the peers, and allows the peers to locate files within the overall P2P network. This scheme also uses a compound hash checksum to identify files, thereby allowing an identification of identical files as well as distinction of differing files with identical filenames.

Recently, a "torrent-based" P2P file sharing protocol has been adopted by a number of conventional P2P schemes. For example, such schemes generally break a file into smaller fragments, and distribute the fragments across a plurality of peers on the P2P network. To download files using such schemes, peers first download a "torrent file," which contains the address of a tracker node and the hashes of the file fragments. The hash is used to ensure that a malicious attacker can not corrupt the P2P content in distribution. The tracker node maintains a log of which peers are downloading the file in combination with the current progress of the download. Unfortunately, one common problem with conventional torrent-based P2P file sharing schemes is the inability to directly search for files by name within the P2P network. In general, peers must find the initial torrent file by other means, such as a web search.

Such torrent-based schemes are sometimes optimized by distributing the file fragments that are the "local rarest" to more peers. This ensures that rare fragments distributed to the peers can be redistributed to other peers, thereby more fully utilizing each peer's bandwidth resource, and making it more likely that the entire file can be shared. Another optimization of such schemes is to provide an incentive-based strategy that prioritizes uploads to connecting peers which are in turn uploading content back to the current node with the ongoing download. This "tit-for-tat" strategy addresses "leech behavior" that plagues common P2P networks where a peer attempts to download files without allowing itself to be used for uploads.

Another problem with each of the aforementioned P2P file sharing schemes is that they are geared towards sharing small numbers of large static files, such as MP3 music, movies, software distribution, etc. As a result, conventional P2P file sharing schemes are not well suited for use in applications that require more flexible file sharing, such as on-demand movie access, P2P file browsing, friend-to-friend folder sharing, or real-time media streaming.

For example, with respect to media streaming, most conventional P2P schemes are not adapted for efficiently streaming media because they do not care about the order or timing of the delivery of data packets constituting the file or files being downloaded. The files are simply broadcast in pieces from various peers to a client, and then simply locally reassembled in the correct order to reconstruct the original file on the client computer. However, in the case of streaming media, the timing and order of data packets must be carefully considered and controlled to provide for efficient streaming of that media.

The problem of media streaming in P2P networks has been partially addressed by several well known conventional schemes. For example, several conventional P2P schemes use application-level multicast (ALM) protocols for media streaming. In particular, in these ALM-based schemes, the peer nodes are self organized into an overlay tree over an existing IP network. The streaming data is then distributed along the overlay tree. The cost of providing bandwidth is then shared amongst the peer nodes, thereby reducing the bandwidth burden (and thus dollar cost) of running the media server. However, one problem with such schemes is that the leaf nodes of the distribution tree only receive the streaming media and do not contribute to content distribution.

Several related conventional schemes address some of the aforementioned content distribution limitations of generic ALM-based schemes by using multiple distribution trees that span the source and the peer nodes. Each "tree" can then transmit a separate piece of streaming media. As a result, all peer nodes can be involved in content distribution. Another related conventional P2P media streaming solution uses a "cache-and-relay" approach such that peer nodes can serve clients with previously distributed media from its cache.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Mass File Sharer" (MFS), as described herein, provides a mass P2P file sharing protocol with optional on-demand file access across a P2P network. Unlike conventional P2P file sharing, the MFS simultaneously shares and synchronizes large numbers of folders and/or files, while providing optional on-demand access to that shared content. The MFS uses a unique metadata structure in combination with an inter-peer file/folder version analysis and an inter-peer file/folder availability analysis to share complex directory structures that may include any number of folders, sub-folders, and files. In various embodiments, sharing is asynchronous and/or synchronous depending upon assigned file priorities. Specifically, file sharing is generally accomplished as an asynchronous distribution across the network. However, when a particular peer wants direct access particular content, an on-demand access mode is used to enable synchronous delivery of shared files. Further, this combination of asynchronous and synchronous file distribution enables the MFS to support a number of applications, such as on-demand media streaming, P2P file/folder browsing, friend-to-friend (known peers) folder sharing, synchronizing changes in one or a set of files, etc.

In general, the MFS operates within the architecture of an unstructured P2P network. Each peer in the network works independently. Each time a peer comes online, it will connect to a supernode cluster in an attempt to locate other online peers that are (or will be) sharing the same files and/or folders (generically referred to as "entities" or "entity" herein). As with conventional supernode-based methods, each peer first attempts to contact one or more IP addresses corresponding to a list of known supernodes (or supernode clusters). As soon as the peer finds a working supernode, the peer requests a list of currently active supernodes to be used for further connection attempts. Note that the concept of supernode use in P2P networks is well understood by those skilled in art, and will not be described in detail herein.

The peer then picks one supernode as its "server" and uploads a list of entities (folders and/or files) it intends to share to that supernode. The peer also sends search requests to the supernode for entities (folders and/or files) it wants to receive. The supernode then communicates with other supernodes in order to satisfy the peer search requests and provides the requesting peer with a list of other "matching" peers that are sharing entities matching the peer search requests. From this point, the matching peers communicate directly. However, because additional peers may come online (or go offline) at any time, the peers may continue to contact supernodes or supernode clusters (or be contacted by other matching peers following referral by a supernode) whenever appropriate. In fact, any peer may contact a supernode at any time, or on a regular basis if desired, in order to identify additional matching peers over time.

Note that the following discussion will generally refer to communication between two peers, which are generically labeled as Peer A and Peer B for purposes of explanation. However, it should be understood that any given peer in the P2P network enabled by the MFS may be in concurrent contact with a large number of peers that are in turn also in contact with any number of additional peers.

When any two peers (Peer A and Peer B) first communicate following the initial matching by a supernode, those peers first exchange metadata representing the entities (folders and/or files) to be shared. One advantage of sharing this metadata is that it allows peers to share entire (or partial) folders, each folder potentially containing additional sub-folders and/or files, in addition to sharing individual files, if desired. This metadata is structured to allow identification of the entities to be shared (folders, sub-folders, and/or files).

Once the metadata is exchanged between Peer A and Peer B, each of the peers compares a timestamp or other signature (such as a file or folder hash, or any other unique identifier) embedded in the metadata to determine whether each of those peers already has the same overall entity. If the timestamp or other signature of the entity to be shared matches between Peer A and Peer "B," then those peers already have the same data, and no further sharing is necessary between those peers with respect to the entity being shared.

However, if the timestamp or other signature of the entity to be shared does not match, then each of the peers will compare a "version chain" embedded in the metadata to determine what files and/or folders of the entity to be shared differ between the content held by Peer A and the content held by Peer B. In general, the "version chain" represents a known "chain" of all versions of each particular folder, sub-folder, and/or file (as understood by each individual peer) contained within the entity to be shared. As with the overall entity being shared, individual timestamps and/or signatures are used to identify each individual folders and/or files to construct the version chain. Then, by directly comparing these version chains, it is possible for each peer to determine whether the other peer has a more current version (or whether it has a partial version) of a particular folder, sub-folder, or file, within the overall entity being shared.

In comparing a particular version chain, if Peer B determines that the version chain of Peer A completely contains the version chain of Peer B, then Peer B will understand that the version chain of Peer A is more current than the version chain of Peer B. For example, if the version chain held by Peer A is "1-2-3-5-7-9", and the version chain held by Peer B is "1-2-3-5", then the version chain of Peer B is fully contained by the version chain of Peer A. Consequently, in this example, Peer B will update its version chain to correspond to the version chain held by Peer A.

Conversely, if Peer A determines that the version chain of Peer B completely contains the version chain of Peer A, then Peer A will understand that the version chain of Peer B is more current than the version chain of Peer A. Consequently, Peer A will update its version chain to correspond to the version chain held by Peer B.

However, in the case where one version chain is not contained within the other, then the two differing version chains will be merged to form a composite version chain, and both peers will update their version chains with the composite version chain. In other words, this "versioning synchronization" allows peers to ensure that the most current version of shared files/folders are shared in the case where multiple users/peers have the capability to modify those files/folders. Conflicts between non-matching versions are handled automatically even in the case where many versions exist between multiple peers.

Once Peer A and Peer B have updated their version chains, as described above, the two peers will then exchange "availability vectors" which generally describe which of the folders, sub-folders, and/or files corresponding to the updated version chains are actually held by Peer A and Peer B. Note that as with conventional P2P networks, each of the peers may also hold portions or blocks of individual files without holding the entire file. Furthermore, as sharing of the requested entity progresses, each peer will inherently hold more blocks and or files of the shared entity, and will thus be able to share that newly received content (or portions thereof) with other peers. Finally, given the availability vectors, Peer A and Peer B begin to share the requested content as a function of the exchanged availability vectors.

In view of the above summary, it is clear that the MFS P2P protocols described herein provides a unique system and method for providing folder and/or file sharing between a plurality of peers in a P2P network. In addition to the just described benefits, other advantages of the MFS will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
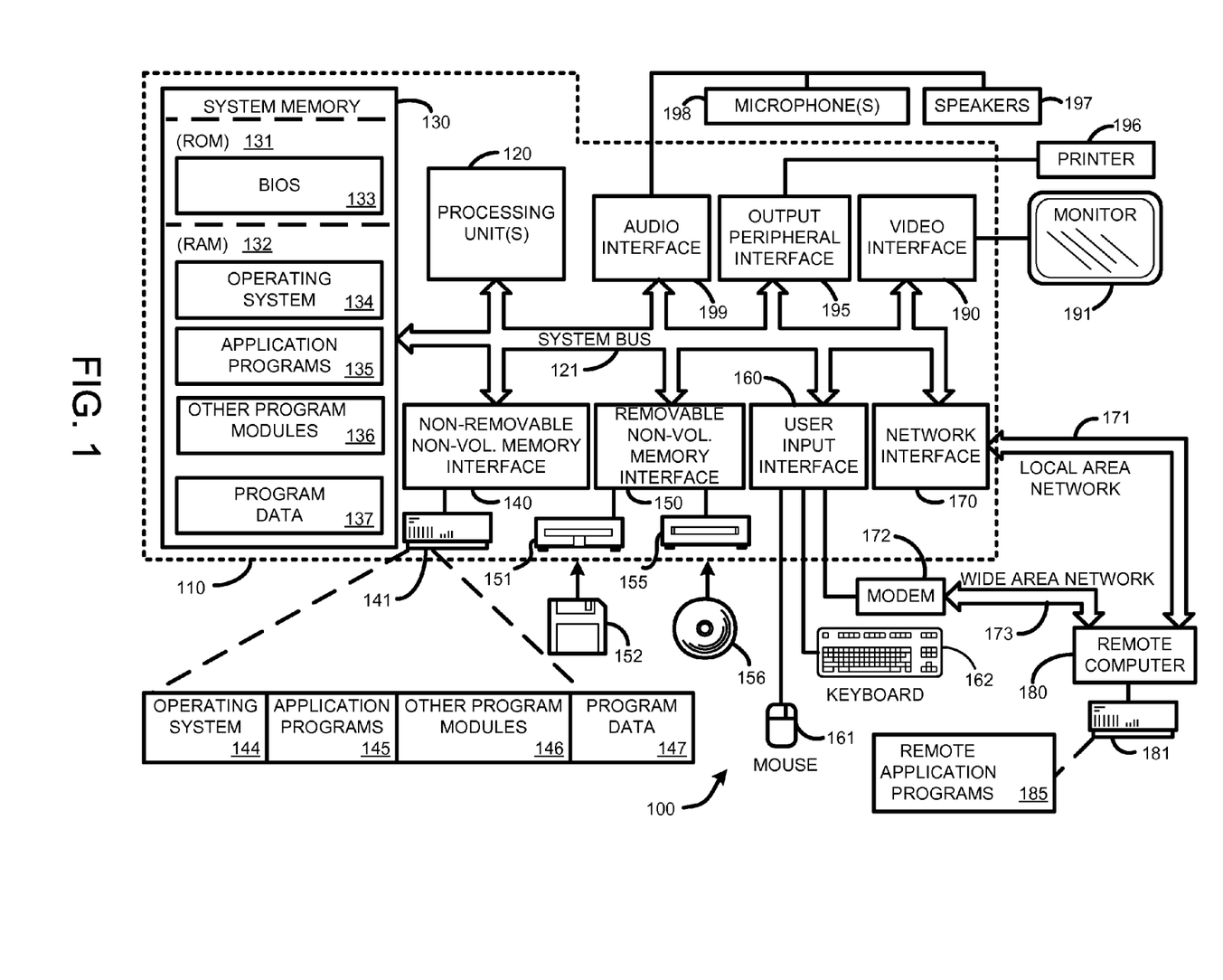
FIG. 1 is a general system diagram depicting a general-purpose computing device constituting an exemplary system implementing a "Mass File Sharer" (MFS), as described herein.
Figure 2:
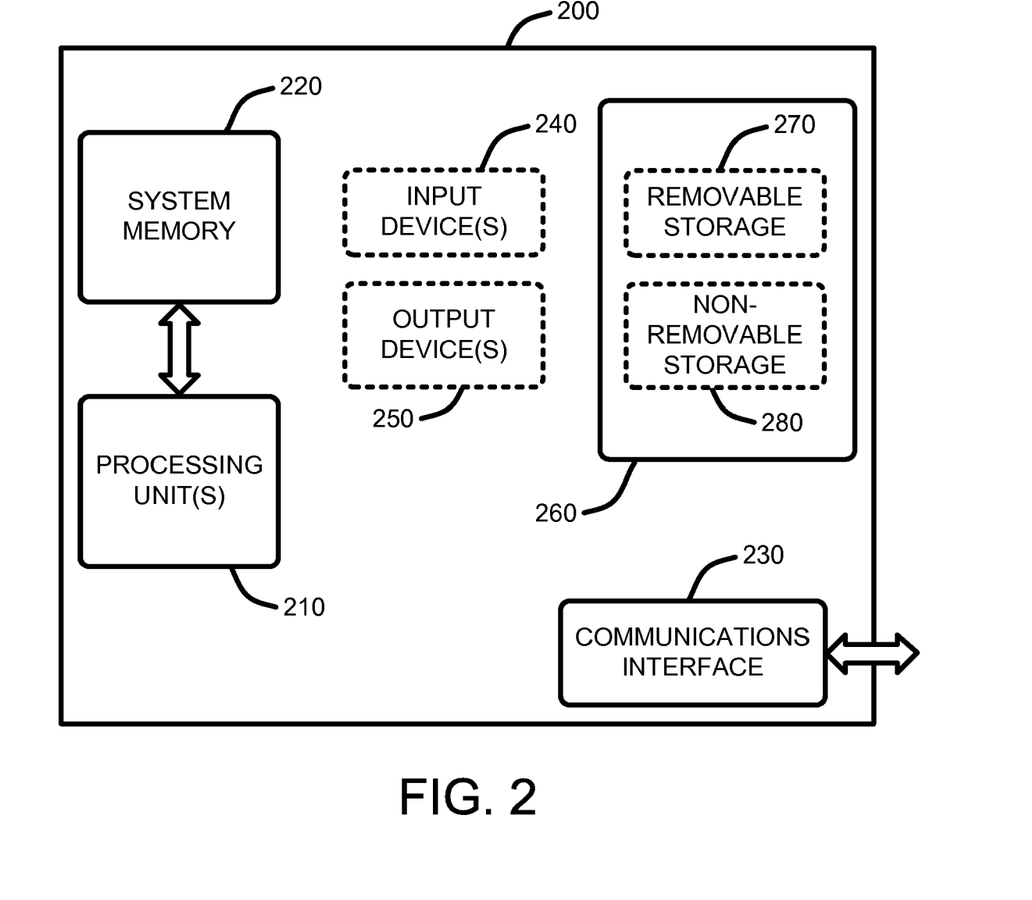
FIG. 2 is a general system diagram depicting a general device having simplified computing and I/O capabilities for use in a P2P enabled by the MFS, as described herein.
Figure 3:
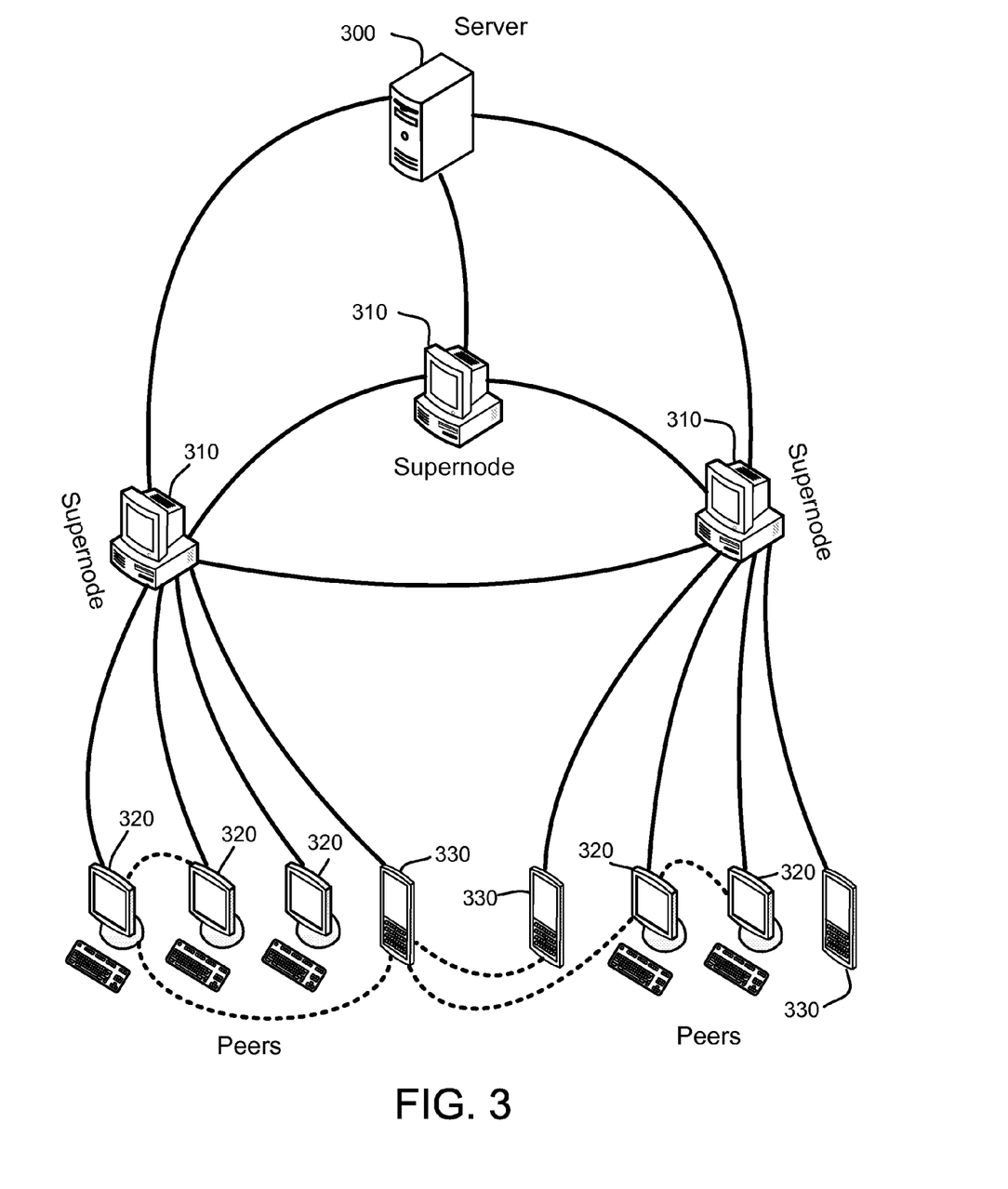
FIG. 3 illustrates an exemplary supernode-based peer-to-peer (P2P) network for use in implementing the MFS, as described herein.

1.0 Exemplary Operating Environment:

FIG. 1 and FIG. 2 illustrate two examples of suitable computing environments on which various embodiments and elements of a "Mass File Sharer" (MFS), as described herein, may be implemented. In addition, FIG. 3 illustrates a simple example of a supernode-based P2P network environment within which the MFS operates, as described herein.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media such as volatile and nonvolatile removable and non-removable media implemented in any method or technology for storage of information such as computer readable instructions, data structures, program modules, or other data.

For example, computer storage media includes, but is not limited to, storage devices such as RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface, including, for example, cell phones PDA's, dedicated media players (audio and/or video), etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to join the overall P2P network environment to participate in content sharing operations, the device must have some minimum computational capability, some storage capability, and a network communications interface. In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). Finally, the simplified computing device of FIG. 2 also includes storage 260 that is either removable 270 and/or non-removable 280 (analogous to the storage devices described above with respect to FIG. 1).

The exemplary operating environment having now been discussed, the remaining part of this description will be devoted to a discussion of the program modules and processes embodying a "Mass File Sharer" which provides a mass peer-to-peer (P2P) file sharing protocol with optional on-demand file access across a P2P network.

2.0 Introduction:

A "Mass File Sharer" (MFS), as described herein, provides a mass P2P file sharing protocol with optional on-demand file access across a P2P network. Unlike conventional P2P file sharing schemes, the MFS is capable of sharing and synchronizing large numbers of folders and/or files simultaneously, while providing optional on-demand access to specific shared files. In other words, unlike conventional P2P schemes which generally share individual files, the MFS uses a unique metadata structure in combination with an inter-peer file/folder version analysis and an inter-peer file/folder availability analysis to share complex directory structures which may include any number of folders, sub-folders, and files.

Further, given the synchronous content access and asynchronous file distribution, peers can selectively expose or share a large number of folders and/or files organized in directory trees to the network, or to particular authorized peers within the network. The shared files are then asynchronously and/or synchronously distributed into the network as described in further detail below. This combination of asynchronous and synchronous file distribution enables the MFS to support a number of applications, such as on-demand media streaming (movies, music, audio, etc.), P2P file/folder browsing, friend-to-friend (known peers) folder sharing, synchronizing changes in one or a set of files, etc.

2.1 System Overview:

As noted above, the MFS described herein provides the capability to share and synchronize mass numbers of files simultaneously across a loosely coupled peer-to-peer (P2P) network. Note that while the MFS described herein is applicable for use in large P2P networks with multiple peers, the following description will generally refer to individual peers (or pairs of communicating peers) for purposes of clarity of explanation. Those skilled in the art will understand that the described system and method offered by the MFS is applicable to multiple peers, and that it can be scaled to any desired P2P network size.

In general, the MFS operates in a server or supernode-based P2P network. For example, a generic supernode-based P2P network is illustrated by FIG. 3. The server 300 and the supernodes 310 can be dedicated computers setup for the MFS operation, or they can be end-user nodes. The peers 320 and 330 are all end-user nodes (such as PC-type computers, PDA's, cell phones, or any other network-enabled computing device) variously connected over the internet. The server node 300 performs administrative functions that are not generally performed by the peers 320 and 330, e.g., maintaining a list of available supernodes, performing digital rights management (DRM) functionality, etc.

In addition, it should be clear that as with many other P2P type networks, the role of particular nodes is flexible, and may change. For example, a particular node may act as a peer 320 in one particular P2P session, while acting as a supernode 310, or even as a server 300, in another session. Further, particular nodes can simultaneously act as both supernodes 310 and peers 320, or even as a server 300, depending upon whether those nodes are sending or receiving content. Note that the concept of supernode use in P2P networks is well understood by those skilled in art, and will not be described in detail herein.

During a content sharing session, each peer 320 or 330 first locates a number of "matching peers" 320 or 330 (indicated by broken line connections between various peers). "Matching peers" are those groups of peers that hold some or all of the desired or requested content. These peers are identified as "matching" by submitting content availability messages (content to be shared) and content request messages (content to be received) to one or more of the supernodes 320.

For example, whenever a peer 320 or 330 comes online, it will connect to one or more supernodes 310 or supernode clusters in an attempt to locate other online peers that are (or will be) sharing the same files and/or folders (generically referred to as "entities" herein). Online peers 320 or 330 sharing/requesting the same content are generically referred to herein as "matching peers." A list of these matching peers, with the appropriate contact information is provided by the supernodes 310 or supernode clusters in response to the peer 320 or 330 requests, and the matching peers then communicate directly. However, because additional peers 320 or 330 may come online (or go offline) at any time, the peers may continue to contact supernodes or supernode clusters (or be contacted by other matching peers following referral by a supernode) whenever appropriate. In fact, any peer 320 or 330 may contact a supernode 310 at any time, or on a regular basis if desired, in order to identify additional matching peers over time.

In particular, when any two matching peers 320 or 330 first communicate, those peers first exchange metadata representing the entities (folders and/or files) to be shared. This metadata is structured to allow identification of the entities to be shared (folders, sub-folders, and/or files). The metadata includes a "version chain" that defines an update history of the metadata. If the peers 320 or 330 hold different parts of the information to be shared, then the peers will compare a "version chain" embedded in the metadata to determine what files and/or folders of the entity to be shared differ between the content held by the peers, and which peer has the most up to date versions of particular files and/or folders. Following this comparison, the metadata and the version chains of each peer 320 or 330 are updated to the most current version. Once the metadata is exchanged, each of the peers 320 or 330 will exchange "availability vectors" which generally describe which of the folders, sub-folders, and/or files corresponding to the updated version chains are actually held by each peer. The peers 320 or 330 then begin to share the requested content as a function of the exchanged availability vectors, as described in further detail below.

Figure 4:
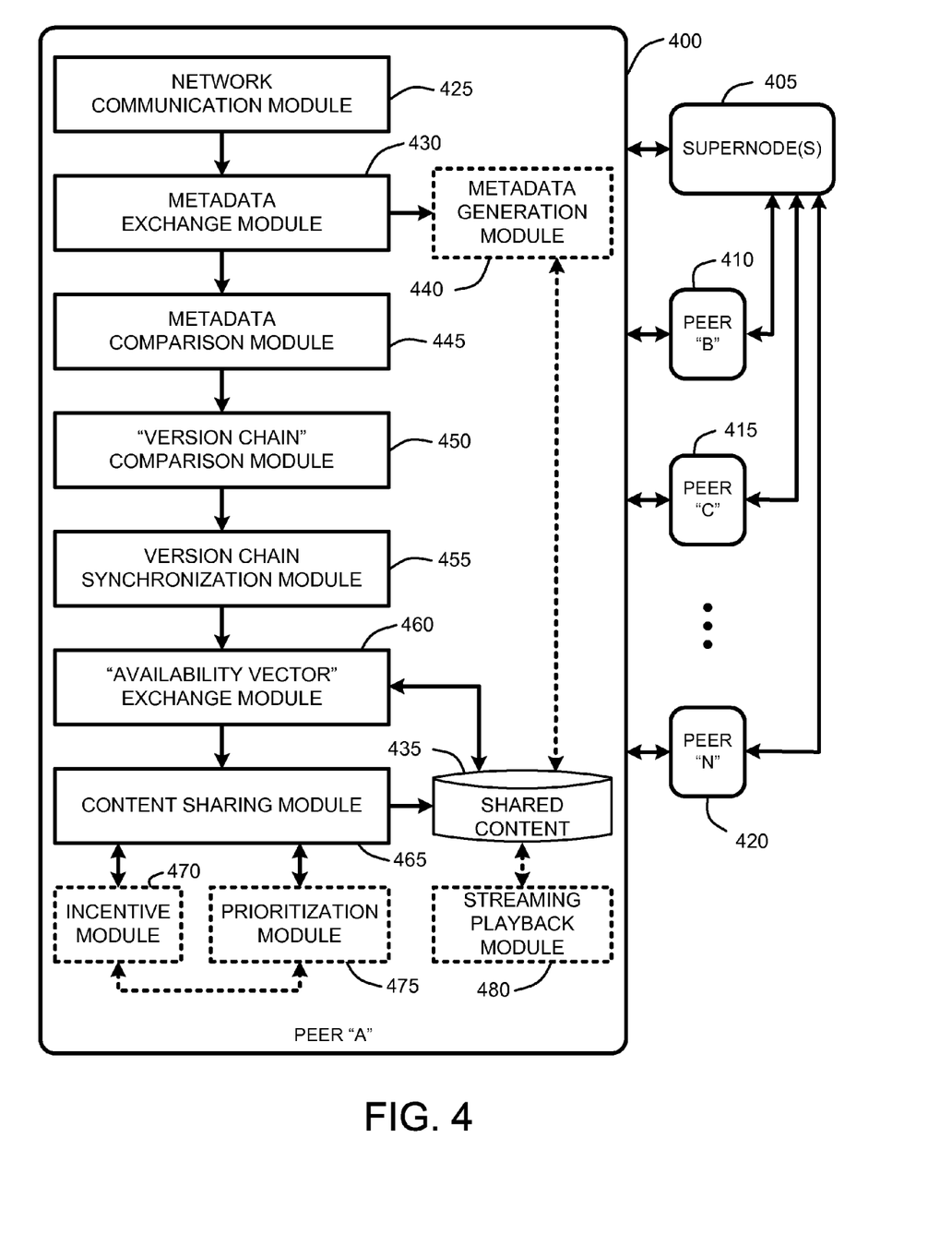
FIG. 4 provides an exemplary architectural flow diagram that illustrates program modules for implementing the MFS, as described herein.

2.2 System Architectural Overview:

The processes summarized above are illustrated by the general system diagram of FIG. 4. In particular, the system diagram of FIG. 4 illustrates the interrelationships between program modules for implementing the MFS, as described herein. It should be noted that any boxes and interconnections between boxes that are represented by broken or dashed lines in FIG. 4 represent alternate embodiments of the MFS described herein, and that any or all of these alternate embodiments, as described below, may be used in combination with other alternate embodiments that are described throughout this document.

Note that for purposes of explanation, the following discussion will generally refer to communication between two of the illustrated peers, which are generically labeled as Peer A 400 and Peer B 410. However, it should be understood that any given peer in the P2P network enabled by the MFS may be in concurrent contact with a large number of other peers that are in turn also in contact with any number of additional peers.

In general, as illustrated by FIG. 4, the MFS is enabled by a connection of a plurality of peers (400, 405, 410 and 415) across a P2P network, such as the network described with respect to FIG. 3. Each of the peers (400, 410, 415, and 420) generally includes the same basic program modules for enabling the MFS. Consequently, for purposes of explanation, rather then reiterating each of those program modules for every peer, FIG. 4 illustrates those modules only for Peer A 400. Peers B through "N" (410, 415, and 420) are understood to include the same program modules as shown for Peer A.

Each time a peer (400, 410, 415, and 420) comes online, it will use a network communication module 425 to connect to a supernode 405 or supernode cluster in an attempt to locate other online peers that are (or will be) sharing the same files and/or folders (generically referred to as "entities" herein). Then, when any two peers (Peer A 400 and Peer B 410) first communicate following the initial matching by the supernode 410, those peers use a metadata exchange module 430 to exchange metadata representing the content 435 or entities (folders and/or files) to be shared.

One advantage to sharing this metadata is that it allows peers (400, 410, 415, and 420) to share entire (or partial) folders 435, each folder potentially containing additional sub-folders and/or files, in addition to sharing individual files, if desired. In general, the metadata is included either as a header embedded within the shared content 435, or as a separate file associated with the shared content. Further, in one embodiment, a metadata generation module 440 is used to automatically construct the metadata whenever a peer (400, 410, 415, and 420) first indicates that it desires to share particular content 435. In either case, the metadata is derived from the shared content, and is exchanged separately from that content during this initial communication between the peers (400, 410, 415, and 420). As described in further detail in Section 3, this metadata is structured to allow identification of the entities 435 to be shared (folders, sub-folders, and/or files).

Once the metadata is exchanged between Peer A 400 and Peer B 410 via the metadata exchange module 430, each of the peers uses a metadata comparison module 445 to compare a timestamp or other signature (such as a file or folder hash, or any other unique identifier) embedded in the metadata. This comparison enables each of the peers 400 and 410 to determine whether each of those peers already has the same overall entity. If the timestamp or other signature of the entity to be shared matches between Peer A 400 and Peer B 410, then those peers already have the same data, and no further update of the metadata is necessary between those peers.

However, assuming one of the peers 400 or 410 requesting the shared content 435 doesn't already have that metadata, or in the case that the timestamp or other signature of that data does not match, this is an indication that each of the peers has a different understanding of the current version of the entity to be shared. In either case, each of the peers 400 and 410 will then use a "version chain" comparison module 450 to compare a plurality "version chains" embedded in the metadata. Comparison of these version chains allows each of the peers 400 and 410 to determine what files and/or folders of the entity to be shared differ between the content held by Peer A and the content held by Peer B.

In general, as described in further detail in Section 3, the "version chain" represents a known "chain" of all versions of each particular folder, sub-folder, and/or file (as understood by each individual peer) contained within the entity/content 435 to be shared. As with the overall entity 435 being shared, individual timestamps, signatures, hashes, etc., are used to identify each individual folder, sub-folder and/or files to construct the version chain. Then, by directly comparing these version chains, it is possible for each peer 400 and 410 to determine whether the other peer has a more current version, a partial version, or even any version at all, of a particular folder, sub-folder, or file, within the overall entity 435 being shared.

In comparing the version chains, if Peer B 410 determines that the version chain of Peer A 400 completely contains the version chain of Peer B, then Peer B will understand that the version chain of Peer A is more current than the version chain of Peer B. Consequently, Peer B 410 will use a version chain synchronization module 455 to update its version chain to correspond to the version chain held by Peer A 400. Conversely, if Peer A 400 determines that the version chain of Peer B 410 completely contains the version chain of Peer A, then Peer A will understand that the version chain of Peer B is more current than the version chain of Peer A. Consequently, Peer A 400 will use the version chain synchronization module 455 to update its version chain to correspond to the version chain held by Peer B 410.

Further, in the case where the version chain comparison module 450 determines that one version chain is not contained within the other, then the two differing version chains will be merged by the version chain synchronization module 455 to form a composite version chain. Both peers 400 and 410 will then use the version chain synchronization module 455 to update their version chains with the composite version chain. In other words, this "versioning synchronization" provided by the MFS allows peers to ensure that the most current version of shared files/folders are shared in the case where multiple users/peers have the capability to independently modify those files/folders. As described in further detail in Section 3, conflicts between non-matching versions are handled automatically even in the case where many versions exist between multiple peers.

Once Peer A 400 and Peer B 410 have updated their version chains, as described above, the two peers will then use an "availability vector" exchange module to exchange "availability vectors." In general, these "availability vectors" generally describe which of the folders, sub-folders, and/or files corresponding to the updated version chains are actually held by Peer A 400 and Peer B 410. Note that the availability vectors will also indicate whether any of the peers 400 and 410 holds portions or blocks of individual files without holding the entire file. Furthermore, as sharing of the requested entity progresses, each peer will inherently hold more blocks and or files of the shared entity, and will thus be able to share that newly received content (or portions thereof) with other peers. Consequently, updated availability vectors are prepared as necessary whenever one of the peers contacts a new peer in the manner described above.

Next, given the exchange of availability vectors between the peers 400 and 410, Peer A and Peer B are fully aware of what portion of the shared content 435 the other peer holds. As a result, each peer 400 and 410 begins requesting those folders, sub-folders, and/or files corresponding to the updated version chain. The requested information is transmitted across the P2P network using any conventional block-based asynchronous transmission protocol (such as TCP with ARQ, for example), via a content sharing module 465. Further, in one embodiment, described in further detail in Section 3, the content sharing module 465 also uses a block admission mechanism to prevent the same block from being sent from multiple peers to the same destination peer. Once finished, each peer will hold content 435 corresponding to the updated version chain.

Further, in another embodiment, the aforementioned sharing of content 435 is accomplished using a sender-driven incentive-based sharing protocol operating under the control of an incentive module 470. The use of this incentive-based sharing protocol is provided to address a common problem wherein one peer wants to receive content without fairly sharing content in return. In particular, the incentive module 470 rewards a peer 400 or 410 by increasing the sharing bandwidth to those peers that are in turn increasing their own sharing bandwidth to other peers. The result of using this incentive-based sharing is that the efficiency of the entire P2P network is generally increased.

Further, in another embodiment, a prioritization module 475 allows any peers 400 and 410 to request on-demand access to particular folders, sub-folders, and/or files. In particular, the prioritization module 475 allows a requesting peer to prioritize the content 435 being requested in order to control what content 435 is received first. Note that this prioritization also extends to the individual blocks comprising individual files so that files, such as media files, can be synchronously streamed across the P2P network. In general, as described in further detail in Section 3, the prioritization module 475 operates by assigning "price tags" or "scores" to particular folders, sub-folders, files, or blocks of the content 435 being shared. Then, those blocks having the highest price tags or score are sent first to the requesting peer so that the highest priority (highest score) content is received first. Further, this prioritization may also be used to allow real-time or partially buffered streaming media (movies, music, audio, etc.) to be provided for immediate playback by a requesting peer via a streaming playback module 480.

In a hybrid embodiment, the incentive module 470 and the prioritization module 475 are interconnected so that the prioritization of particular folders, sub-folders, files, or blocks of the content 435 being shared is combined with the aforementioned sender-driven incentive-based sharing protocol. In particular, in this additional embodiment, higher priced or scored blocks shared by a peer will give that peer more "credit" with respect the overall sharing process. As a result, peers sending higher priced or scored blocks to other peers are treated as if those peers had increased their sharing bandwidth for purposes of receiving increased bandwidth allocations from the incentive module 470 with respect to the receipt of requested content 435 from other peers.

3.0 Operation Overview:

The above-described program modules are employed for implementing the MFS. As summarized above, the MFS uses a unique metadata structure in combination with an inter-peer file/folder version analysis and an inter-peer file/folder availability analysis to share complex directory structures that may include any number of folders, sub-folders, and files. The following sections provide a detailed discussion of the operation of the MFS, and of exemplary methods for implementing the program modules described in Section 2 with respect to FIG. 4.

3.1 Operational Details of the Mass File Sharer:

The following paragraphs detail specific operational and alternate embodiments of the MFS described herein. In particular, the following paragraphs describe details of the MFS metadata structure; content author information; content synchronization via the version chain comparison; peer availability vectors; sender driven incentive-based sharing; on-demand access; and the use of block exchange protocols to avoid duplicate transmissions. Following the detailed description of the aforementioned features of the MFS, an operational flow diagram is described in Section 4, with respect to FIG. 5, which summarizes the overall operation of one generic embodiment of the MFS in view of the following detailed description.

3.2 Mass File Sharer Metadata Structure:

As noted above, the MFS provides a unique metadata structure that allows peers to share entire (or partial) folders, each folder potentially containing additional sub-folders and/or files, in addition to sharing individual files, if desired. This metadata (also referred to herein as a "metadata ID") is structured to allow identification of the entities to be shared (folders, sub-folders, and/or files). For purposes of sharing, a folder or sub-folder is simply considered a specific type of file that potentially contains a list of other files and folders.

In alternate embodiments, any folder to be shared is described in one of two formats in the metadata structure. First, in one embodiment, the folder is described in a "long format," which contains the description of all descendant files and folders under the current folder. In addition, in a related embodiment, the folder to be shared is also described in a "short format," which contains just the description of all the immediate descendant files and folders under the current folder (e.g., further levels of sub-folders contained within sub-folders are not described in the "short format." Either or both of these formats are used in alternate embodiments of the metadata structure. In general, the "short" folder information is stored locally by each peer, and the "long" folder information is created automatically by scanning the directory structure to be shared when the metadata structure describing that folder is generated and exchanged with other peers for sharing.

For example, assume Peer A is going to share Folder 1, and that Folder 1 comprises the following sub-folders and files:

Folder 1
    Sub-folder 1.1
        Sub-folder 1.1.1
            File 1.1.1.1
            File 1.1.1.2
    Sub-folder 1.2
        File 1.2.1
        File 1.2.2
    File 1.3

In view of the preceding description of "short" and "long" folder descriptions, the "short" description of Folder 1 consists of the metadata of Sub-folder 1.1, Sub-folder 1.2, and File 1.3. Similarly, the "long" description of Folder 1 consists of the metadata of all files and sub-folders, and thus consists of the metadata of Sub-folder 1.1, Sub-folder 1.1.1, Sub-folder 1.2 and Files 1.1.1.1, 1.1.1.2, 1.2.1, 1.2.2 and 1.3.

Next, continuing with the description of the metadata structure, both files and folders have a "body" and associated metadata. For files, the "body" is simply the contents of the file, and the corresponding metadata simply contains property information related to that file, such as, for example, file name, file attribute, creation date, identifying signature or hash, etc. However, folders may include two bodies: a short body that corresponds to the aforementioned short description of the folder, and a long body that corresponds to the aforementioned long description of the folder. In either case, these "descriptions" represent "document IDs" that are included in the metadata, as described below. The metadata of folders contain properties related to the folder, e.g., folder name, folder attribute, creation date, etc. Clearly, any desired metadata can be included so long as that metadata allows for a description of the data structure (folders, sub-folders, files) and a unique identification of those files sufficient to determine the most recent version when comparing two metadata structures.

For example, in a tested embodiment, the metadata of folders and files shared by the MFS included the following information, some of which is optional, as described in further detail in the following sections:

author (author ID);
    document ID (name);
    timestamp, hash, or other unique identifier; and
    version chain The author ID and the document ID serve to uniquely identify particular folders or files. In addition, the timestamp or other unique identifier is used along with the version chain for version chain synchronization, as described in further detail below. All document IDs that are shared by a certain peer are stored in a computer readable format, such as, for example, a lookup table or a hash table, or the like. This enables commonly shared files and folders to be quickly identified.

For example, referring back to the above-described "Folder 1," assume that Folder 1 is shared by Peers A, B and C while Sub-folder 1.1 is shared by users D, E and F. Then, Peers A, B and C will use the document ID of Folder 1 as the "root folder," while Peers D, E and F will use the document ID of Sub-folder 1.1 as the "root folder." In addition, all peers will hold the document IDs of all files and folders shared in their own lookup table or hash table. Further, because the folder description is contained in the metadata, it will be apparent that Sub-folder 1.1 is a child of Folder 1. Therefore, since Peers A, B and C are sharing Folder 1, they are also sharing Sub-folder 1.1. As a result, Peers D, E and F can be easily identified as sharing Sub-folder 1.1 with Peers A, B and C.

3.3 Content Author Information:

Author information is not a requirement of the MFS. However, it is often useful information. As a result, in one embodiment, the author information, i.e., the aforementioned "author ID" is included in the metadata structure.

In general, a file or folder belongs to an author. However, the concept of an "author" is more general than the peer user. In particular, as defined with respect to the overall system and method provided by the MFS, the "author" is a collection of computers and users that have the same sharing authority over a particular collection of files and folders. For example, if a particular user creates three separate root sharing folders that he/she is sharing with different sets of friends, family members, and/or co-workers:

1) an online working folder of the user;
2) a family photo collections shared by the family members; and
3) a set of files that the user is sharing for a work project, then three separate "authors" will be created by the MFS with respect to that single user.

One advantage to the use of "author" information is that it enables the use of encryption keys, including a public signing key and a private signing key for controlling content access and permissions, even when that content is stored within an otherwise publicly addressable storage. As a result, all shared content can be encrypted/decrypted and signed, as desired. Then, the public signing key of the user is distributed to anyone who asks for it. Thus, all peers will be able to validate the integrity of the shared content, even if they are not authorized to access and/or modify the content. However, all users/peers that are allowed to access the content are provided with the encryption/decryption key. Finally, all users/peers who are allowed to modify the content are provided with the private signing key.

3.4 Content Synchronization—Version Chain Metadata:

When any two peer nodes initially establish connections, they will first perform two tasks: 1) folder metadata information synchronization; and 2) file and folder availability synchronization.

The folder metadata synchronization ensures that both peers have the most recent copy of the folder metadata information. This is accomplished, in part, by ensuring that whenever a peer modifies a folder or file that is to be shared, a new version identifier is appended to the version chain associated with that file. The version identifier of a folder or file can be a timestamp or other identifier (hash, digital signature, etc.), or a combination of any of the above. While the use of timestamps alone might be sufficient to form the version, it is possible that two peers could make different changes to a file at the same time. Therefore, instead of using only timestamps as version identifiers, other information such as a file hash or file signature can be used as version identifiers. In one embodiment, in addition to using a timestamp, a random number is also added to each timestamp update. This allows differentiation between files when the timestamp of different peers is the same.

In other words, the basic idea of the version chain is to gather the history of all past file versions (in the form of timestamp, hash, signature, random number, etc.) into one chain, and by comparing the chain, rather than all versions of the actual file, find if there is any conflict among the various peers.

In general, the point of version synchronization is to ensure that the version of the folders and/or files shared by the peers is the same. Further, if one or more files in a certain folder has been changed, the folder synchronization needs to detect what has been changed, upon which basis the change is made, and whether there are any conflicts caused by the file change (such as independent changes by two or more peers). This folder synchronization process is described below.

In general, when two peers connect, they first exchange the metadata, and thus the root folder ID, that is shared by the two peers. Then, a set of common shared folders are identified.

For each set of common shared folders, the peers first compare the most recent version identifiers (using the corresponding metadata) of the root folders held by the two peers. If their versions are the same, the folder shared by the two peers has not changed, and the two peers are sharing the same version of the same set of files and folders. Consequently, there is no need for the peers to transmit those folders metadata to each other. However, if the versions are not the same, the version chains of the two peers are further exchanged and compared to determine where the content diverges between those peers.

For example, as described above, if the version chain of Peer A is contained in the version chain of Peer B, then Peer B has made new changes upon the content held by Peer A. The folder metadata and version chain of Peer A will be updated by those of Peer B. Conversely, if the version chain of Peer B is contained in that of Peer A, then the folder metadata and version chain of Peer B is updated with that of Peer A.

However, if the version chains diverge, such that one is not contained within the other, then it is assumed that Peer A and Peer B may have made independent modifications to one or more of the files and/or folders being shared, and the version chains need to be merged. One implementation of the merge is to create two entities for any files or folders having a diverged version chain. In particular, one entity corresponding to the entity held by Peer A will be created with the version chain of Peer B, and another entity corresponding to the entity held by Peer B will be created with the version chain of Peer A. Both entities will be listed in the root folder holding the diverging entities, and it will be up to the users of Peer A and Peer B to resolve such conflicts. Consequently, for each file and/or folder that does not have a compatible version chain, two files and/or folders corresponding to the different versions will be created. Then, since each peer will ultimately have both versions of such files or folders, it will be up to the end user to manually merge the two versions (such as by purging or renaming one version), if desired.

Another embodiment is to let the merged version chain be the union of the version chain of Peer A and Peer B, and select the entity that has the latest timestamp as the surviving entity. This embodiment is not favored though, as one of the modifications without the latest timestamp could be lost in the merge.

A third embodiment is to let peers keep copies of intermediate files. In particular, as noted above, each peer will have an updated version chain for each folder and/or file following the above described versioning synchronization. These updated version chains are then used as described in further detail below to ensure that each peer has the most current version of all of the files being shared. However, in this embodiment, the intermediate files represent "older" versions of particular files that are held by a peer. Therefore, rather than replace that older version, it is kept as an intermediate file while the more current version is shared with that peer so that the peer has the most current folder/file set being shared. In the case where the intermediate version is kept, it is either automatically renamed to indicate to the user that it is an older version of a particular file, or it is automatically copied to an alternate folder so that there is no file name conflict.

During metadata exchange and version chain synchronization, if Peer A finds that Peer B has a more up-to-date metadata of the file or folder, or Peer A requests sharing of a file/folder for the first time, Peer A needs to retrieve the metadata of the file/folder from Peer B. If Peer A just starts sharing a certain folder, it will signal that it wants to retrieve the "long" folder description of the shared folder. Otherwise, the "short" folder description is generally used. However, it should be appreciated that it is possible to operate exclusively with the long folder description in every case, and that the short folder description is provided simply as one way to minimize the size of the metadata structure.

3.5 Peer Availability Vectors:

As noted above, following version synchronization via the above-described version chain comparisons and updates, the two peers will next synchronize on availability, i.e., how many files and folders are actually held by each peer by generating and exchanging an "availability vector" with respect to the updated version chains held by each peer.

At the time of availability synchronization, both peers have already performed version synchronization (i.e., set of updated version chains describing the folder/file structure to be shared), which ensures that the folder descriptions used by the two peers are identical. Each peer then determines whether they have the content represented by the updated version chains, and generates their unique "availability vectors" to inform the other peers of what content corresponding to the common version chains are held locally. These availability vectors can contain all or part of the entire file and folder structure for the content to be shared. However, since the version chains held by each peer are identical following the aforementioned versioning synchronization, in one embodiment, a compact bitstream is used to speed up the exchange of the availability vector.

For example, in one embodiment, availability vector encoding is performed for each folder and file by using a specific tag to identify whether the entire file or folder is: 1) available; 2) non-available; or 3) partially available. For partially available files and folders, it is then necessary to further describe what is available in the files and folders. Starting from the root folder, if all the files and directories under the root folder are available, the entire root folder is marked as "all available", say with tag '11'. If none of the files and folders under the root folder are available, the root folder is simply marked as "non available", say with tag '00'. Otherwise, the root folder is marked as "partially available", say with tag '01'. For the partially available root folder, the availability of each individual file and folder is then marked. In particular, for each file and subdirectory in the root folder, tag '11' is again used to mark an item as all available, tag '00' is used to mark the item as non available, and tag '01' is used to mark the item as partially available. The process will iterate again for the partially available sub-folders. For partially available files, a bitstream is used to show what portion of the files (the blocks) are actually available. Clearly, any desired tag can be used to describe the availability of the content to be shared, and the MFS is not intended to be limited to the use of the tags described above.

Given the above example, in the simplest case, the entire availability vector for a peer holding the entire content to be shared can be as simple as "11." Clearly, for partially held content, the availability vector will be longer, depending upon how much content is to be shared. However, given that the result is simply a string of 1's and 0's, in one embodiment, the coded availability vector bitstream is further compressed by applying a conventional lossless codec, e.g., LZW or Huffman or Arithmetic coder, so that the size of the availability vector representation is further reduced, if desired.

In any case, once the availability vectors, compressed or not, have been exchanged between matching peers, those peers are then able to begin sharing the content needed to ensure that each peer has the most current version of that content, as defined by the common updated version chains.

3.6 Block Exchange Protocols and Peer Message Traffic:

When sharing files between a plurality of peers, it is important to avoid duplication in transmitting particular blocks in order to maximize the use of the available bandwidth. Consequently, in one embodiment, the MFS uses a "propose-to-send" (PTS) list and "confirm-to-receive (CTR)" list to avoid blocks from being sent by various peers to the same destination.

For example, consider a multi-peer P2P connection as follows where Peer A is sharing with Peer B, C, D and E, while Peer B is further sharing files with Peers F, G and H. Considering the sharing pipeline between Peer A and Peer B in this case, Peer A will compile a list of blocks that it intends to send to Peer B and form a propose-to-send (PTS) list. Peer A will then transmit this PTS list to Peer B. In response, Peer B examines the received PTS list, checks if the blocks to be sent by the Peer A have already been proposed by any other peers, and compiles a confirm-to-receive (CTR) list as a subset of the PTS list. Peer B then transmits the CTR list back to Peer A. However, because the CTR list is a direct answer to the PTS request, in one embodiment, rather than resend the entire CTR list, it is observed that the CTR list can simply be a mask of the PTS block list proposed by Peer A. This allows compression of the list in order to preserve available bandwidth.

Then, only those blocks that are allowed by the CTR message will be actually sent from Peer A to Peer B (as prioritized based on the score of the blocks in the case of on-demand synchronous transfers). Further, at the same time that the CTR message is sent by Peer B, Peer B also compiles a report-arrival-block (RAB) message which is sent to the neighbor peers (F, G and H) which are also sharing blocks affected by the CTR message. The RAB message serves as an update of the block availability vector of Peer B, and makes sure that the other peers will not re-propose the blocks to be sent from Peer A.

If the connection from Peer A to Peer B stales for a variety of reasons, e.g., slowdown in network connection, Peer A crashes, Peer B may send a negative RAB message to its neighbor peers (F, G, and H). The negative RAB message update the block availability vector of Peer B, and makes sure that the other peers can re-propose the blocks promised by Peer A but that were failed to be delivered.

In addition to the PTS, CTR and RAB messages described above, the MFS also uses several other optional message types to assist the MFS in sharing files. In particular, other messages used by the MFS in performing file sharing operations include a "ROOT" message which is used to indicate the sharing root folder; an "ON_DEMAND" message which is used by a peer to indicate the files and folders that are put on that peer's "on demand" list; and a "BK" message that contains the delivered block data.

3.7 Incentive-Based Sharing and On-Demand Access:

In general, the MFS provides an incentive-based sharing protocol that facilitates on-demand access. In the simplest embodiment, peers are "rewarded" with higher receiving bandwidth for content that they have requested whenever they increase the bandwidth of sending content that is requested from them. This basic idea has been applied to a number of conventional P2P file sharing schemes. However, in addition to this simple embodiment, the MFS provides additional variations of the incentive-based sharing concept that extend its usefulness with respect to on-demand access, and mass sharing of content.

In particular, as discussed in the preceding sections, each file shared by the MFS has a unique ID. Furthermore, during the file sharing, each file is split into blocks, each block of which is the elementary sharing and storage unit. However, in one embodiment, each block is also assigned a price tag or score. This price tag is then used by the MFS to determine which block gets shared first, with higher priced or scored blocks being sent first. In addition, as part of the overall incentive-based sharing process, each peer counts the contribution of blocks from its connected peers.

Given this general background, consider a sharing pipeline from Peer A to Peer B using the same peer sharing arrangement example described above in Section 3.6. Specifically, assume that in addition to sharing files with Peer B, Peer A is further sharing files with Peers C, D and E, while Peer B is further sharing files with Peers F, G and H. In this interconnected sharing environment it is necessary to determine how many and what blocks should be sent from Peer A to B as an "incentive" to encourage Peer B to send content back to Peer A.

First, the MFS counts the combined contributions of Peers B, C, D and E to Peer A. For example, the contribution from Peer B to Peer A will be equal to the amount of valid content sent from Peer B to Peer A, with extra contribution credit being given for on-demand files (or portions thereof) as a function of the price tag or score associated with those files. In other words, if Peer A puts a certain file on its on-demand list, the content of those files will be counted more favorably towards the contribution of Peer B. Peer A will then divide its available upload bandwidth according to the contributions of Peer B, C, D and E. The more the other peers contribute to Peer A, the more Peer A will contribute back to the other peers. Such "tit-for-tat" sharing provides an incentive for peers to share files with their neighbors.

The sharable blocks from Peer A to B are those blocks that are shared between Peer A and B, are available on Peer A, and are not available on Peer B. Peer A sets a price tag on each sharable block, and use the price tag to determine which block should be first sent to Peer B. The price tag of a sharable block is a combination of the demand of the Peer A and its neighborhood and the "local rarity" of the sharable block.

For example, in one embodiment, the price tag of a sharable block is determined as follows:

Price=(receiver_on_demand)+(partial_file_credit)+
(peer_on_demand_sender)+(peer_on_demand_receiver)+
(folder_description_credit)+(local_rarity_receiver)+
(local_rarity_sender)

The components of the above price computation equation are defined as follows:

receiver_on_demand: The demand (content request) of the destination Peer B plays an important role in the price tag. If Peer B is accessing the file/folder in the on-demand mode (synchronous file transfer mode), the MFS will use this variable to raise the price tag on those sharable blocks associated with the file.

local_rarity_sender: The MFS will use this variable to increase the price tag for each peer in the sender's local neighborhood (Peers C, D and E) that is also sharing the block, but does not have a copy of the block (as determined via each peer's availability vector).

local_rarity_receiver: The MFS will use this variable to increase the price tag for each peer in the receiver's local neighborhood (Peers F, G and H) that is also sharing the block, but does not have a copy of the block (as determined via each peer's availability vector).

peer_on_demand_sender: The MFS uses this variable to increase the price tag of any file that has been put on the on-demand sharing list of the sender's neighborhood (Peer C, D and E).

peer_on_demand_receiver: The MFS uses this variable to increase the price tag of any file that has been put on the on-demand sharing list of the receiver's neighborhood (Peer F, G and H).

partial_file_credit: The MFS uses this variable to increase the price tag for remaining blocks of a partially transferred file. In particular, if a certain file is in the transfer process, this variable provides an additional incentive for the MFS to complete the transfer by granting extra credit for such transfers in the form of higher priced blocks. The rationale here is that a fully available file is more useful to the system, and also costs less to describe in availability.

folder_description_credit: The MFS uses this variable to increase the price tag where the shared file is folder description.

Once the sharable blocks are scored or priced, they are sorted in order of price and transmitted in order of highest to lowest priced (i.e., in order of highest to lowest priority). However, it should be noted that in one embodiment, if additional peers come on-line or go off-line during the sharing process, the scores of various blocks are recomputed using the variables described above.

Figure 5:
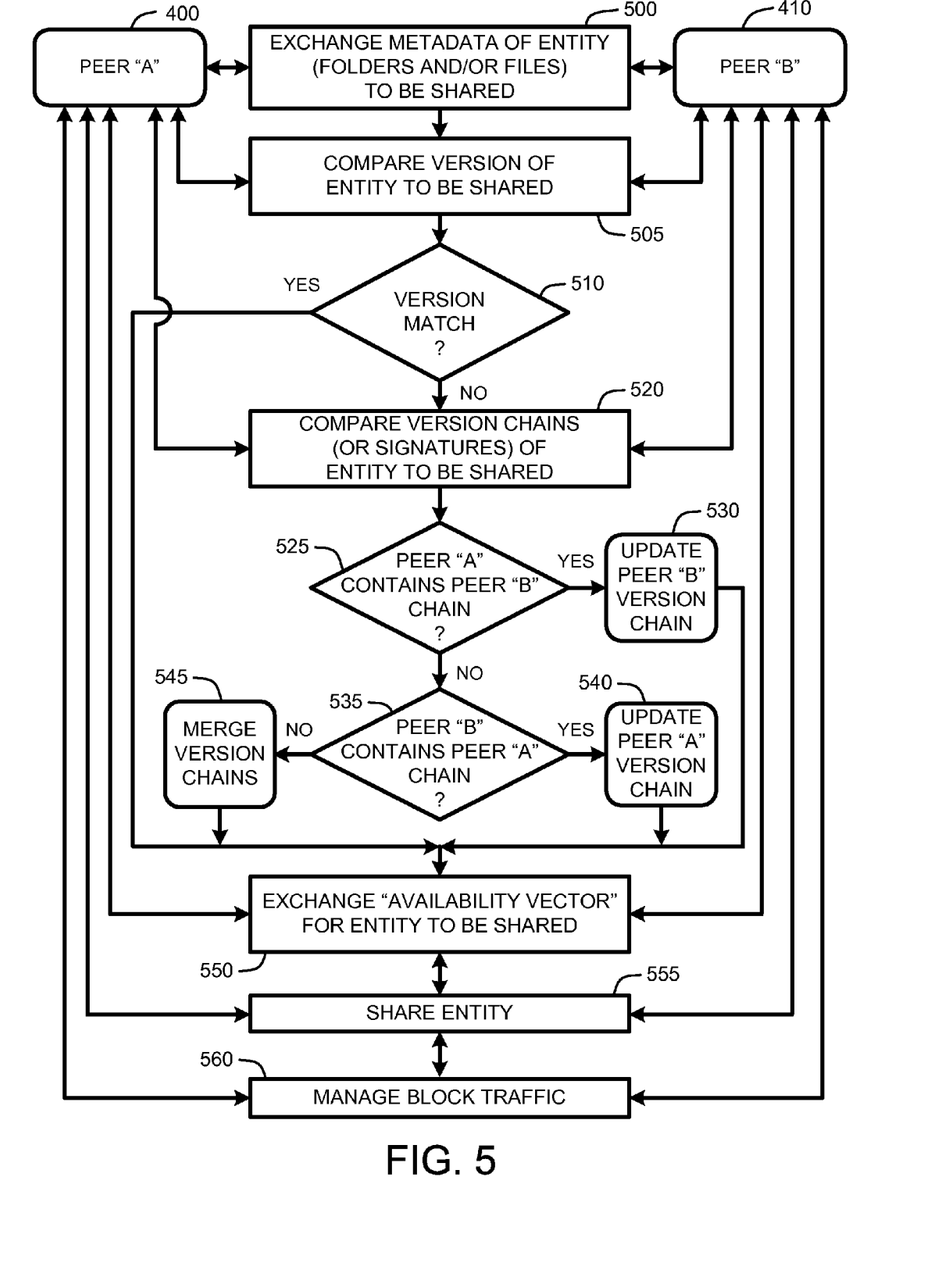
FIG. 5 provides an exemplary operational flow diagram illustrating general operation of one embodiment of the MFS, as described herein.

4.0 Mass File Sharer Operation:

The processes described above with respect to FIG. 2 through FIG. 4 are illustrated by the general operational flow diagram of FIG. 5. In general, FIG. 5 illustrates an exemplary operational flow diagram showing a generic operational embodiment of the MFS. It should be noted that any boxes and interconnections between boxes that are represented by broken or dashed lines in FIG. 5 represent alternate embodiments of the MFS described herein, and that any or all of these alternate embodiments, as described below, may be used in combination with other alternate embodiments that are described throughout this document.

Before describing the operational flow diagram, it should also be noted that as with several of the preceding examples presented herein, FIG. 5 illustrates only two peers in communication. However, in actual operation, it is expected that a plurality of variously interconnected peers will be simultaneously sharing content. Clearly, the MFS is not intended to be limited to communication between two peers, and this arrangement as illustrated in FIG. 5 is provided only for purposes of explanation.

In particular, as illustrated by FIG. 5, as soon as two peers, Peer A 400 and Peer B 410 are matched by a supernode, as described above, in their first communication the peers will exchange 500 a metadata ID file or bitstream that includes a definition of the entity (i.e., the folders and/or files) to be shared that is held by each peer. Each peer (400, 410) then separately compares 505 a "root folder" timestamp or other signature (the version) in the metadata to determine whether the metadata of content to be shared is already the same. In particular, if this version matches 510, then the shared content is considered to be the same, and the sharing operation goes to step 550.

However, in the case where this first signature does not match 510, then each peer (400, 410) begins exchanging and comparing 520 version chains representing each file and/or folder dependent from the root folder being shared. Note that in the case where the version chain corresponding to a subfolder matches, it is not necessary to continue comparing the version chains of the contents of that subfolder, as the metadata will inherently match since the version chain of the entire parent subfolder matches. However, in each case where a version chain (for a file or subfolder) held by Peer A 400 contains 525 a version chain held by Peer B 410, then the version chain held by Peer B is updated 530 to correspond to the version held by Peer A. Conversely, in each case where a version chain (for a file or subfolder) held by Peer B 410 contains 535 a version chain held by Peer A 400, then the version chain held by Peer A is updated 540 to correspond to the version held by Peer B.

On the other hand, if neither Peer A 400 or Peer B 410 contains the version chain of the other for a particular file or folder, then the version chains corresponding to that particular folder or file are merged 545. Again, it should be noted that there are separate version chains for every folder and/or file, and that the above version chain comparisons (525 and 535) are performed for every folder and file except in the case where versions chains of a particular folder or sub-folder matches, as noted above.

Once all of the version chains have been updated (530 or 540) or merged (545), each peer will hold an identical set of version chains corresponding to the entire content to be shared. Each peer (400 and 410) then examines the content it has locally and prepares and exchanges 550 an availability vector with the other peer so that each peer is aware of what content the other peer holds relative to the set of identical version chains.

Given these exchanged 550 availability vectors, each peer (400 and 410) then begins the sharing process 555 by sending requests to the other peer for content held by the other peer that is needed by those peers to complete their local folder/file set relative to the identical set of version chains corresponding to the entire content to be shared.

Further, as part of this sharing process 555, each peer (400 and 410) acts to manage block traffic 560 with the other peer by sending the aforementioned "propose-to-send" (PTS) list to the other peer that is responded to with the aforementioned "confirm-to-receive (CTR)" list to avoid blocks from being sent by various peers to the same destination, as described above. In addition, in the typical case where there are more than two peers involved this sharing process 555, management of block traffic 560 will include additional inter-peer messages including the "report-arrival-block" (RAB) message which is sent to any other peers which are also sharing any blocks affected by the CTR message. In addition, any RAB message serves as an update of the block availability vector of the sending peer.

Finally, as described above, as part of the overall management of block traffic, 560, in one embodiment, incentives (in the form of increased download bandwidth) are used to encourage peers to increase their upload bandwidth or to send on-demand or higher scored blocks in a synchronous fashion rather than using the default asynchronous block transfer performed by each peer.

The foregoing description of the Mass File Sharer has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Mass File Sharer. It is intended that the scope of the invention be limited not by this detailed description, but rather by the claims appended hereto.

What is claimed is:

1. A computer-readable medium having computer executable instructions for providing content definitions for coordinating content sharing in a peer-to-peer (P2P) network, said computer executable instructions comprising:

for each of a plurality of peers, identifying one or more matching peers in a P2P network, said matching peers having corresponding content sharing interests;

for each matching peer and starting at a sharing root of each matching peer, preparing a root metadata ID file describing the content to be shared between the matching peers;

wherein the sharing root of each matching peer represents a directory tree structure of folders and files to be shared by each peer;

wherein each metadata ID includes data that describes the directory tree structure of folders and files comprising the content to be shared by each matching peer;

wherein each metadata ID further includes data defining version chains representing a version history comprising a history of all past versions of the directory tree structure and any folders and files in that directory tree as known by each matching peer including a most recent modification to any of the directory tree structure and to any folders and files in that directory tree comprising the content to be shared by each matching peer; and exchanging the root metadata ID file prepared for each matching peer with every other matching peer via the P2P network to identify a set of shared files and folders between the matching peers.

2. The computer-readable medium of claim 1 wherein each peer:

establishes a local lookup table to hold an identification of all shared folders and files of the current peer and after exchanging the root metadata ID with each other peer, performs a table lookup to identify commonly shared folders and files by comparing each received metadata ID with the local lookup table.

3. The computer-readable medium of claim 1 wherein the version chains include timestamps corresponding to the content to be shared for identifying the most recent modifications to any of the directory tree structure and to any folders and files in that directory tree.

4. The computer-readable medium of claim 1 wherein the version chains include hashes of the content to be shared for identifying the most recent modifications to any of the directory tree structure and to any folders and files in that directory tree.

5. The computer-readable medium of claim 1 wherein the version chains include signatures of the content to be shared by each matching peer for identifying the most recent modifications to any of the directory tree structure and to any folders and files in that directory tree.

6. The computer-readable medium of claim 1 further comprising for each matching peer, preparing an availability vector describing which portions of the content to be shared are held by each matching peer, and exchanging that availability vector with every other matching peer via the P2P network.

7. The computer-readable medium of claim 1 further comprising exchanging the version chains between two or more peers, and comparing the exchanged version chains to identify the more current content between those peers.

8. The computer-readable medium of claim 7 wherein:
a portion of the shared files and folders are identified for synchronous access, thereby giving a higher priority to those files and folders during corresponding data transfers of those files and folders via the P2P network; and
wherein the rest of the shared files and folders are identified for asynchronous access, thereby giving a lower priority to those files and folders during corresponding data transfers of those files and folders via the P2P network.

9. A method for identifying data to be shared between peers in a peer-to peer (P2P) network, comprising using a computing device for:
using one or more peer computing devices to query a P2P network to identify one or more matching peer computing devices having matching data sharing interests;
using each of the peer computing devices to locally prepare a root metadata ID for a root of a shared folder corresponding to the matching data sharing interests of each of those peer computing devices;
wherein the root of the shared folder represents a directory tree structure of folders and files to be shared;
wherein each root metadata ID, further includes data representing one or more of a timestamp, a unique signature and a unique hash, and wherein the timestamps, signatures and hashes are created as a function of a most recent modification to the any of the directory tree structure and any folders and files described by the root metadata ID to create a version chain which defines a history of modifications representing a history of all past versions of directory tree structure of folders and files to be shared as known by each peer computing device; and
exchanging the root metadata ID prepared by each peer computing device with every other matching peer computing device via the P2P network.

10. The method of claim 9 further comprising for each peer computing device, locally comparing the root metadata ID received from each other peer computing with the locally prepared root metadata ID to determine a set of files and folders that are commonly shared between the peers.

11. The method of claim 10 further comprising for each peer computing device, locally preparing an availability vector describing which portions of the folders and files are locally held by each peer computing device and exchanging that availability vector with every other matching peer computing device via the P2P network.

12. The method of claim 11 further comprising sharing the folders and files between two or more of the matching peer computing devices via the P2P network after the exchanging of the availability vectors.

13. A system for coordinating content sharing interests between peers in a peer-to-peer (P2P) network, comprising:
for each of a plurality of peers attached to a P2P network, means for identifying one or more matching peers in a P2P network that have corresponding content sharing interests corresponding to a root share folder of each peer;
for the root share folder of each matching peer, means for preparing a metadata ID describing a directory tree structure of folders and files contained within the root share folder as a function of the corresponding content sharing interests;
wherein each metadata ID further includes data defining version chains representing a version history comprising a history of all past versions of the root share folder and any folders and files contained with the root share folder as known by each matching peer including a most recent modification to any of the root share folder and any folders and files contained with the root share folder;
means for exchanging the metadata ID prepared by each peer with every other matching peer via the P2P network; and
for each peer, means for evaluating the received metadata ID's to identify commonly shared file and folders.

14. The system of claim 13 further comprising for each peer, means for locally preparing an availability vector describing which portions of the folders and files are locally held by each peer, and exchanging that availability vector with every other matching peer via the P2P network.

15. The system of claim 14 further comprising means for sharing the folders and files between two or more of the matching peers via the P2P network after the exchange of the availability vectors.

16. The system of claim 13 further comprising for each peer, means for establishing a local lookup table to hold identification information of all commonly shared folders and files.

* * * * *